United States Patent [19]

Menzel

[11] 4,177,947
[45] Dec. 11, 1979

[54] IRRIGATION DEVICE

[75] Inventor: Stanley W. O. Menzel, Santee, Calif.

[73] Assignee: Reed Irrigation Systems Pty. Ltd., Elizabeth, Australia

[21] Appl. No.: 951,111

[22] Filed: Oct. 13, 1978

[51] Int. Cl.² ............................................. B05B 15/00
[52] U.S. Cl. ..................................... 239/542; 138/45; 239/569; 251/126; 251/209
[58] Field of Search ............... 239/396, 397, 542, 569, 239/582, 477; 251/126, 207, 208; 138/42, 43, 45 A

[56] References Cited

U.S. PATENT DOCUMENTS

| 3,897,009 | 7/1975 | Rangel-Garza et al. | 239/542 |
|---|---|---|---|
| 3,998,244 | 12/1976 | Bentley | 239/542 |

Primary Examiner—Robert B. Reeves
Assistant Examiner—Michael J. Forman
Attorney, Agent, or Firm—Gordon L. Peterson

[57] ABSTRACT

An irrigation device with variable flow control which is arranged to give either a drip feed through an elongated helical channel or a sprinkler feed through a direct outlet to a sprinkler and acts as a valve to shut off flow also by turning a key within a body to locate relevant passages.

5 Claims, 6 Drawing Figures

IRRIGATION DEVICE

The invention relates to an improved irrigation device.

Irrigation devices are already well known and usually these are of a type utilizing a sprinkler where spread of water is required over an area or the devices are in the nature of flow control members generally known as "drip feed" devices and such devices, as well as the sprinklers, can take many forms.

The drip feed devices of course are of various forms but include devices where a helical or spiral water path is used to restrict the flow due to friction and many devices of this type are known in the field of drip irrigation.

So far as the sprinklers are concerned these include micro jet sprays and are usually used where large volumes of water are required for a given tree or area or when a larger area per outlet needs to be covered, for example, under the leaf canopy of a well established tree, also in some vegetable or green house crops it is necessary to mist spray for propogation and to then change over to drip feed for the remainder of the crop's growing cycle.

In the past, it has therefore been necessary to use two systems whereby this can be achieved and an object of the present invention is to simplify the equipment for both spray irrigation and drip feed or emission irrigation and this is achieved according to this invention by combining the two functions in a single unit.

It is already known in devices such as those which are sold under the name "Key Emitter" to so arrange the devices that using an elongated helical or spiral path to control the rate of emission, the key member has been removable or adjustable to allow clearing of the narrow restrictor path and avoid blockage by sediment or the like and according to this invention a device of that type can be used as the drip feed or emission device but associated with the body of the device is a spray emitter which can be manipulated by the key so that for instance the key can in one position allow the device to act as a sprinkler or spray device, in another position it can allow flow for cleaning of the restrictor channels, and in another position it allows the restrictor to operate to cause the device to discharge water in a controlled emission or drip feed manner.

Therefore it will be realised that the invention combines in one device such features as:
 (1) Mist Spraying
 (2) Drip Irrigation
 (3) Cleaning The invention comprises a hollow body closed at one end and having a first nipple and a second nipple spaced from each other, and within the body a key which closely fits the hollow of the body and is inserted into the body from one end and has its inner end terminating adjacent to the closed end of the hollow body but to leave a space at that end of the body with which a hollow in the first nipple communicates, the key having a channel formed in it which leads from the space to the periphery of the key remote from the inner end and in one rotational position of the key communicates with a hollow in the second nipple, the key having a peripheral helical groove in its surface which communicates at one end with the space and at the other end with a channel which communicates with the hollow of the second nipple when the key is in another rotational position, and means to removably hold the key in the body.

In order that the invention will be fully understood a prepared embodiment will now be described with reference to the drawings, in which.

It will be obvious that the device can be varied considerably in its construction but as illustrated it has a body 10 which can be secured to a hose or other line through which water under pressure is supplied for irrigation purposes, and this body has on it a nipple 11 which engages in and seals into an aperture through the wall of the hose or tube, and within a hollow of the body is a key 12 having a helical groove 13 in its periphery arranged to control emission of water from the body by reason of the friction introduced by flow through a helical groove.

Figure 1:
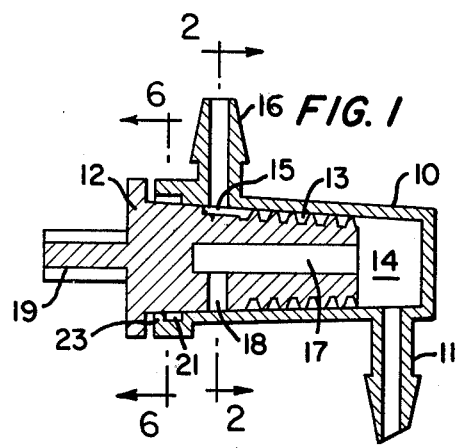
FIG. 1 is a longitudinal section with the key in the drip feed position.
Figure 2:
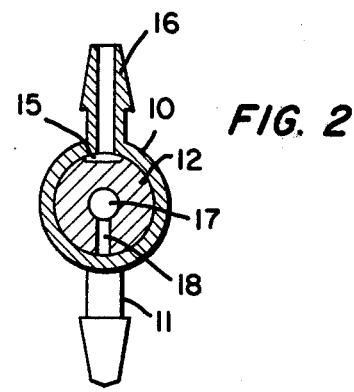
FIG. 2 is a section on line 2—2 of FIG. 1.

The helical groove 13 communicates at one end with a space 14 between the inner end of the key 12 and a closed end of the hollow body 10, and at the other end with a channel 15 which communicates with the hollow of the nipple 16 when the key is in the rotational position illustrated in FIGS. 1 and 2.

Figure 3:
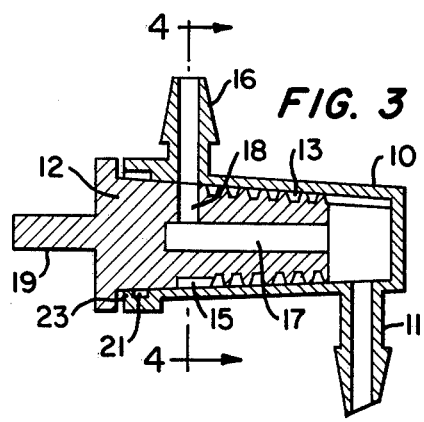
FIG. 3 is a view similar to FIG. 1 but with the key in the spraying position.
Figure 4:
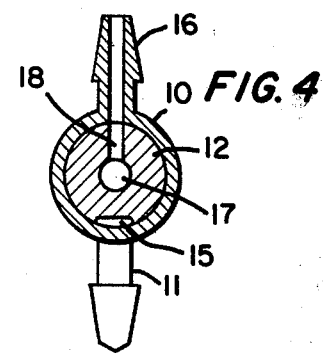
FIG. 4 is a section of FIG. 3 on line 4—4 of FIG. 3.
Figure 5:
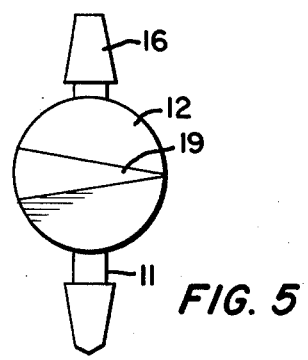
FIG. 5 is an end elevation of the device.

The key also has in it a channel 17 which communicates through the channel 18 with the hollow of the nipple 16 when the key is in the rotational position illustrated in FIGS. 2 and 3, so that rotation of the key 12 about its axis can cause a lesser flow through the nipple 16 when in the position illustrated in FIGS. 1 and 2 but a greater flow when in the position illustrated in FIGS. 3 and 4.

In an intermediate rotational position the flow is cut off so that according to the position of the key three functions can be selected. The key can be rotated by the knob 19 which is arranged as a pointer to indicate the selected function.

Figure 6:
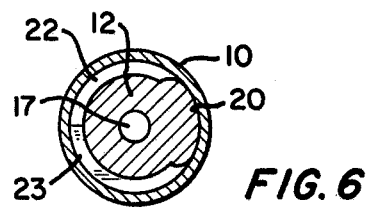
FIG. 6 is a section on line 6—6 of FIG. 1.

To locate the key 12 axially in the hollow of the body 10, the key has on it a projection 20 which fits into a groove 21, but the groove has part of its wall cut-away at 22 so that when the key is turned to its mid-position, the projection 20 passes into the groove 21 through the cut-away and if it is then turned to right or left the groove passes behind the wall 23 as shown in FIG. 6 to axially confine the key 12 in the body 10. The key and the aperture in the body are slightly tapered to achieve a good fit.

Obviously the construction can be varied and instead of using a rotary motion, a sliding motion may be desired but it will be realised that the improved device can be formed with little or no extra cost above a normal drip feed device, or a sprinkler device, and will have the required multiple functions so that a change can readily be made from spray irrigation to drip feed irrigation. Also the key can readily be withdrawn.

In the illustrations the nipple 11 is described as the inlet nipple and the nipple 16 as the outlet nipple but flow could be in the opposite direction. However it is preferred to have the pressure side at the inner end of the hollow body.

The nipple 16 can form a sprinkler or spray device and may be specially shaped for this purpose but in the form illustrated a small tube preferably engages the nipple 16 and this leads to a misting device which can be of any approved form and which when the key is turned to the drip feed position then has a low water flow or drip operation.

From the foregoing it will be realised that when devices of the nature of the present invention are installed for irrigation purposes, various types of irrigation can be carried out by the same line of devices and while reference has been to two functions namely that of using a sprinkler or spray or using controlled emission such as drip feed irrigation, it will be obvious that combinations of these two functions could be used and that both the form of emission control device and the form of spray jets can be widely varied to suit differing purposes.

The claims defining the invention are as follows:

1. An irrigation device with variable flow control comprising,
a hollow body closed at one end and open at the other end and having a first nipple and a second nipple spaced from each other along said hollow body, and within the body a rotatable key having a periphery which closely fits the hollow of the body and is inserted into the body from said other end and said key having an inner end terminating adjacent the closed end of the said hollow body to leave a space at said closed end of the body with which a passage in the first nipple communicates, the key having a channel formed therein which extends from said space to the periphery of the key remote from the said inner end and in one rotational position of the key communicates with a passage in said second nipple, the key having a peripheral helical groove which communicates at one end with the said space and at the other end with a channel which communicates with said passage of said second nipple when the key is in another rotational position, and means to removably hold the key in said body.

2. An irrigation device according to claim 1 wherein said first nipple is the inlet nipple and including means associated with said second nipple for forming a spray device.

3. An irrigation device according to claim 1 or 2 wherein said key tapers from a larger to a smaller diameter end and has an operating knob externally of the hollow of said body and disposed at the larger diameter end, said smaller diameter end being said inner end of said key.

4. An irrigation device according claim 3 wherein said key is axially confined in said body by a projection on said key which fits into a groove in said body and engages an outer wall of the groove when in either of its operative positions, said outer wall having a cut-away portion to allow the key to be inserted in the hollow of said body when the key is turned to a position between said operative positions.

5. An irrigation device according to claim 1 or 2 wherein said key is axially confined in said body by a projection on said key which fits into a groove in said body and engages an outer wall of the groove when in either of its operative positions, said outer wall having a cut-away portion to allow the key to be inserted in the hollow of said body when the key is turned to a position between said operative positions.

* * * * *